May 29, 1956  A. E. BADGER ET AL  2,748,007

GLASS REFRACTORY COMPOSITION

Filed Sept. 12, 1951

Inventors
Alfred E. Badger and
Donald E. Sharp
By Nobbe & Swope
Attorneys

United States Patent Office 2,748,007
Patented May 29, 1956

2,748,007

GLASS REFRACTORY COMPOSITION

Alfred E. Badger and Donald E. Sharp, Maumee, Ohio, assignors to Libbey-Owens-Ford Glass Company, Toledo, Ohio, a corporation of Ohio Application September 12, 1951, Serial No. 246,317

7 Claims. (Cl. 106—66)

The present invention relates broadly to glass contacting refractories and more particularly to an improved refractory composition for use in the construction and/or operation of glass furnaces.

In the commercial production of glass by presently known methods, it is common that the glass contact portions of a glass melting tank furnace be constructed of a refractory material, such as clay, fused mullite, zircon or other similar materials formed by conventional methods. As thus used, these materials are employed for substantially the entire glass contact furnace construction and they have, in general, provided a satisfactory enclosure means for the glass melting operation.

However, as would be anticipated, the refractories are subject to corrosion due to the extreme heat, continuous movement and other deleterious effects of the molten glass thereagainst. When molten glass attacks a refractory, the glass which is formed has a chemical composition intermediate between that of the pure refractory and that of the primary glass. This "refractory glass" produces what are known as "cords" in the finished glass. The presence of these cords in the finished product, whether it be a glass bottle or pane of window glass, gives rise to two serious objections and disadvantages. First, undesirable optical effects are produced by these streaks in the glass. And secondly, the mechanical strength of the product is substantially decreased.

It is believed that the persistence of cords can be attributed to the relatively higher surface tension of the refractory glass than the main glass body. By virtue of this difference in surface tension, the cords produced by the refractory glass tend to "ball up" and present a small surface of contact to the main body of glass, resulting in a hindering of the diffusion process between the cords and glass matrix and continued presence of the cords in the main glass body.

It is therefore an important aim of this invention to substantially eliminate the presence of cords in the glass melt and thereby produce an homogeneous glass by reducing the surface tension of the refractory glass slightly below that of the surrounding glass.

Another object of the invention is to provide a refractory for use in contact with the glass in conventional melting furnaces, which refractory contains therein a relatively small amount of an oxide capable of reducing the surface tension of the refractory glass produced by contact between molten glass and the refractories.

Another object of the invention is to provide a refractory having present therein a relatively small proportion of vanadium or chromium oxide to reduce the surface tension of cords formed therefrom and which may form a part of the stationary glass contact portions of the glass melting furnace itself or may be relatively movable within the molten glass batch.

A further object of the invention is the provision of a refractory containing a predetermined percentage of either vanadium or chromium oxide which may be incorporated in existing furnace constructions and which will not produce undesirable coloring of the glass product in its finished form.

Other objects and advantages of the invention will become more apparent during the course of the following description when taken in connection with the accompanying drawings.

In the drawings, wherein like numerals are employed to designate like parts throughout the same:

Figure 1:
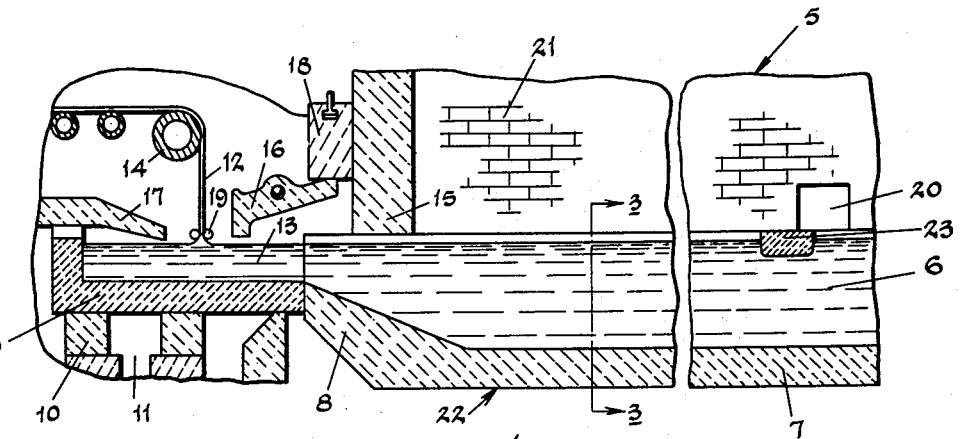
Fig. 1 is a longitudinal vertical section through those portions of a continuous glass melting furnace directly concerned with this invention.

With reference now to the drawings, there is shown a continuous type melting furnace and sheet glass drawing apparatus associated therewith of the type disclosed in the Colburn Patent 1,248,809, granted December 4, 1917. Although the invention is illustrated as applied to, and will be described with reference to the Colburn system, it will be appreciated that it is of equal application and utility regardless of the particular type of furnace or drawing apparatus employed.

In the continuous type of furnace with which the Colburn machine is associated, the glass producing materials are introduced into one end of the furnace, herein designated in its entirety by the numeral 5, through a so-called doghouse and reduced in the melting end of the furnace to provide a mass of molten glass 6 which then flows through the refining end 7 of the furnace into a cooling chamber 8. From the cooling chamber the glass flows into a shallow receptacle or draw-pot 9, the latter generally being supported upon the walls or stools 10 of the heating chamber 11. From the draw-pot 9 the glass sheet 12 is continuously drawn upward from the surface of the pool of molten glass 13 in the draw-pot 9 and while still sufficiently plastic is deflected over the bending roll 14 and carried horizontally through an annealing leer.

In flowing from the furnace into the draw-pot the molten glass passes under a jack-arch 15 and all of the surface glass in said draw-pot, except the comparatively narrow transverse strip from which the sheet is drawn upwardly, is enclosed by the cover or lip-tiles 16 and 17, the former tile being in engagement with an upper tile 18.

At 19 is indicated a pair of small sheet edge gripping rollers which function to maintain the proper width of the sheet as described more in detail in the Colburn patent referred to above.

As is customary with this type of furnace, suitable openings 20 are provided in the side walls 21 to allow convenient access to the interior of the furnace.

In conventional furnace construction the glass contact portions of the side walls 21 and the bottom 22 are manufactured from a suitable refractory material such as clay, zircon or fused mullite. And as was noted above, when the molten glass comes in contact with the refractories forming the bottom and glass contact side walls of the furnace, some of the refractory material dissolves in the glass to form a "refractory glass" which differs in chemical composition from the main body of glass. This refractory glass has a higher surface tension than that of the main glass and produces objectionable cords in the glass. Due to the tendency of these cords to "ball up," they present a small surface to the glass and thereby cause the diffusion process between the cords and glass matrix to occur more slowly. Consequent upon this disadvantageous lack of homogenization between the cords and molten glass body is a product possessive of objectionable optical effects and decreased mechanical strength.

However, such difficulties are herein substantially eliminated by the provision of a glass contact refractory containing therein a relatively small amount of vanadium or chromium oxide, these compounds have the effect of decreasing the surface tension of the refractory glass which causes cords, causing the cords to spread out and present a larger contact area, and resulting in an acceleration of the homogenization process.

Vanadium oxide ($V_2O_5$) or chromium oxide ($Cr_2O_3$) are preferably added to the refractory in the process of manufacture and experience has indicated that more than 1% and less than 5% of these compounds in proportion to the total quantity of clay or other refractory material is productive of the most satisfactory results in flat glass manufacture. Although tests have indicated that the addition of specified amounts of either one of these compounds has produced the desired decreases in surface tension of the refractory glass, it may be desirable under certain circumstances to add both of the oxides to the refractory. However, even in such a case, the total percentage of both $V_2O_5$ and $Cr_2O_3$ in the refractory should not exceed 5%.

In order to test the effectiveness of chromium and vanadium oxide as surface tension depressants and to determine the most desirable amount of either compound to be utilized, conventional clay was chosen as the base material, predetermined amounts of either compound added thereto and a refractory formed by well-known firing techniques. As hereinafter employed, the term "clay refractory" refers to a compound containing 30 to 45% alumina ($Al_2O_3$), 50 to 70% silica ($SiO_2$), and minor amounts of such impurities as titania, iron, lime, magnesia and alkalies.

The glasses resulting from said tests were visually examined after being ground and polished, were examined in a striascope while immersed in a liquid of the same refractive index as the glass, and were examined with a polariscope to detect strain therein due to cords.

*Example 1*

A small refractory bar formed from conventional fired pot clay and measuring about 1 cm. square was immersed vertically in a platinum crucible containing powdered window glass. The glass melt was allowed to attack the refractory for a period of 2 hours at 2600° F., after which the refractory was suspended over the glass for ½ hour in order to permit the glassy sheath surrounding the refractory to drain into the glass melt. The refractory was then removed from its immersed position and heating continued for a period of 3 hours for the homogenizing process. The glass slug was then annealed and examined by the three methods above described. Cordy material was found embedded in the glass, and this was evident even by casual visual inspection.

*Example 2*

The same procedure as above was followed, except that a pot clay refractory containing 1% vanadium oxide was formed and fired in the usual manner and also vertically positioned in the powdered window glass. After the heating treatment above noted was accomplished, the slug was examined. The addition of 1% $V_2O_5$ to the refractory had no apparent effect on the elimination of cords.

*Example 3*

In this test the amount of vanadium oxide was increased to provide a clay refractory bar containing 1½% $V_2O_5$ and the bar immersed in powdered window glass within a platinum crucible. After the heating and annealing procedures above described were accomplished, the slug was examined by the conventional methods above noted. A rapid disappearance of the cords was observed, indicating that an increase in the percentage of $V_2O_5$ from 1 to 1½% provides the desired decrease in surface tension of the glassy cords.

*Example 4*

A small refractory bar of the same size as before was formed with a $V_2O_5$ content of 2%. Following the exact method used previously, an examination of the glass slug showed a marked decrease in cordiness and a remarkable tendency on the part of the cords to spread out and disappear into the glass.

*Example 5*

A small refractory bar containing 3% vanadium oxide was formed and located in the crucible containing powdered window glass in the same manner as above. The crucible was heated as previously, and after annealing, the slug was examined. The results were essentially the same as those cited in Examples 3 and 4 in respect to the absence of cordy glass.

*Example 6*

A clay type refractory which contained therein 4% $V_2O_5$ was vertically arranged within a mass of powdered window glass in a platinum crucible. Subsequent to the heating and annealing described above, the glass slug produced was examined for cords. It was noted that there was an absence of cords throughout the slug and that there was no excessive corrosion of the refractory.

*Example 7*

In this case a refractory bar to which 5% $V_2O_5$ had been added was positioned and heated as in prior examples. Upon examination of the slug it was noted that the cords had spread out and substantially disappeared into the glass. However, there was slight corrosion of the refractory below the glass line indicating that at a temperature of 2600° F., overfiring and initial bloating of the refractory were beginning to occur.

*Example 8*

Additional refractory bars containing 6, 8 and 10% $V_2O_5$ were tested in separate platinum crucibles containing ground window glass. The same method of treatment above described was followed. Examination demonstrated that although cords were decreased and the results were better than in the all-clay refractory of Example 1, excessive bloating and overfiring of the refractories were obvious and the $V_2O_5$ was causing a green color to be manifested in the glass slug.

*Example 9*

Inasmuch as zircon refractories are at times commercially employed instead of clay-type refractories, two additional tests were conducted to demonstrate the effectiveness of vanadium oxide in zircon refractories. A refractory bar of approximately the same size as the clay refractory described in the above examples was formed of zirconium silicate and vertically positioned with a portion thereof embedded within the mass of ground window glass contained in a platinum crucible. An additional zircon refractory bar was prepared which contained 5% $V_2O_5$ and this bar was located in another crucible in the same manner. Both crucibles were heated approximately 2600° F., and after the glass slugs were annealed, they were closely examined in the manner previously described. The result obtained with the zircon refractory bar was substantially identical to that in Example 1 in that cordy glass was produced. However, the presence of 5% $V_2O_5$ in the zircon refractory was sufficient to cause the cords to disappear and a cord-free glass was produced. This test indicates that the addition of critical amounts of vanadium oxide is of important application to zircon as well as clay-type refractories. However, since zircon refractories produce "refractory cords" of somewhat greater surface tension than that caused by clay-type refractories, it may be anticipated that a slightly greater percent of vanadium will be required to lower the surface tension of the refractory glass below that of the main glass. Thus, if 1½% of $V_2O_5$ is necessary in a clay-type refractory to produce the desired elimination of cords, this amount may be increased to a minimum of about 2% addition for use in zircon refractories.

*Example 10*

A further test was conducted to demonstrate the effectiveness of a predetermined percentage of chromium oxide in causing the disappearance of cords. Five percent of $Cr_2O_3$ was added to conventional clay, the mixture shaped into a small refractory bar, and said bar fired by conventional techniques. This bar was then vertically positioned in a platinum crucible containing powdered window glass and the crucible heated at 2600° F. for two hours. The glass sheath surrounding the refractory was allowed to drain into the melt and the heating continued for three hours. The glass slug was removed from the crucible, annealed and then examined. Cords were found to be substantially absent and the slug had an appearance approximating that produced in Examples 3, 4, 5 and 6 above. There was no discoloration of the glass visually apparent nor any excessive corrosion of the refractory. From the results produced with this amount of $Cr_2O_3$, it may be concluded that the presence of 5% of $Cr_2O_3$ in a clay-type refractory causes the disappearance of refractory cords. From our tests on the relative effects of chromium and vanadium in decreasing the surface tension of glass, we have found that about 2½% of $Cr_2O_3$ is equivalent to 1½% $V_2O_5$. Chromium oxide in an amount less than 5% is preferred to avoid the possibility of discoloration of the glass. As thus used, chromium oxide has the advantages of relatively greater refractory corrosion-resistant properties, and in a refractory containing between 30 to 45% $Al_2O_3$ and 50 to 70% $SiO_2$, fired by conventional methods, it provides a floater having a bulk density less than 2.3 and therefore capable of floating on the glass.

From the above examples it is apparent that the most satisfactory range of percentages of chromium oxide and vanadium oxide to clay or zirconium silicate is over 1% and less than 5%, and that 1½ or 2% $V_2O_5$ or 2½% of $Cr_2O_3$ is the optimum quantity to use. Although a marked difference in the relative decrease in cords between a 1½% and 2% $V_2O_5$ refractory was not apparent, it is preferred to utilize the lesser amount in commercial operations due to the cost of the vanadium compound. Then too, any possibility of overfiring of the refractory and coloring of the glass is more effectively precluded.

Refractories containing over 1% and not more than 5% of the chromium or vanadium compounds may be employed for a variety of uses in glass melting furnaces. The $V_2O_5$ or $Cr_2O_3$ containing refractories, which preferably have a bulk density less than 2.3, may be used as gathering rings, boots, skimmers, floaters, glass feeder parts and tank blocks.

Thus, in carrying out the invention, a substantially rectangular solid skimmer 23 having over 1% and not more than 5% $V_2O_5$ or $Cr_2O_3$ mixed within its mass may be located in the refining end 7 of the furnace 5 by introduction through the opening 20 in the side wall 21. As thus positioned transversely of the furnace, the skimmer floats whereby a portion of its height is below the upper surface of the molten glass 6 and there is thereby exerted a beneficial effect on said moving molten glass as it comes in contact with the vanadium or chromium refractory.

Figure 2:
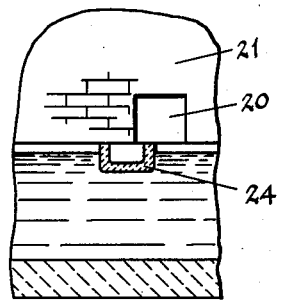
Fig. 2 is another longitudinal section showing a modified form of refractory.

Or if desired, a boat-like skimmer 24, such as is shown in Fig. 2, may be introduced in the same manner through the opening 20 and it will function in substantially the same manner as the skimmer 23 above described. However, being of boat-like shape, this skimmer 24 is of relatively less weight and cost and, when arranged transversely of the furnace, will float higher in the glass melt and skim at a less depth when such is desired.

Figure 3:
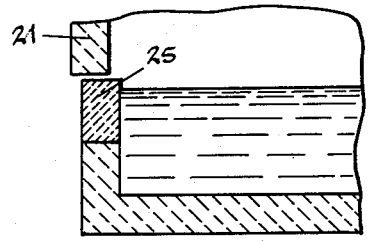
Fig. 3 is a transverse section taken substantially on the line 3—3 of Fig. 1.

Relatively equally beneficial results may be accomplished by constructing a portion of the glass contact side walls 21 with a refractory block 25 containing over 1% and not more than 5% of vanadium or chromium oxide, as is illustrated in Fig. 3. This particular form of refractory may also be utilized in the refining or melting end of the furnace, but conceivably may be positioned within the cooling chamber area and spaced from the jack-arch 15. However, a location in the refining end of the furnace is preferred because of the relatively lower temperature therein and reduced possibility of corrosion of the refractory. The refractory block 25 shown will function in substantially the same manner as the skimmer 23 and 24 above disclosed. That is to say, as the molten glass 6 comes in contact with the blocks 25, corrosion of the refractory will take place and a refractory glass will be formed. However, the cords produced from this glass, having a relatively lower surface tension than the main glass body, will tend to spread out over the surface of the glass, and, even if they do not entirely disappear, will exist merely as a diffuse cloud in the glass matrix. In such a form the cords will be substantially unobjectionable and will not produce undesirable optical effects or decrease the mechanical strength of the glass. By means of this novel refractory, diffusion processes are more rapid and homogenization of the glass melt considerably accelerated.

Figure 4:
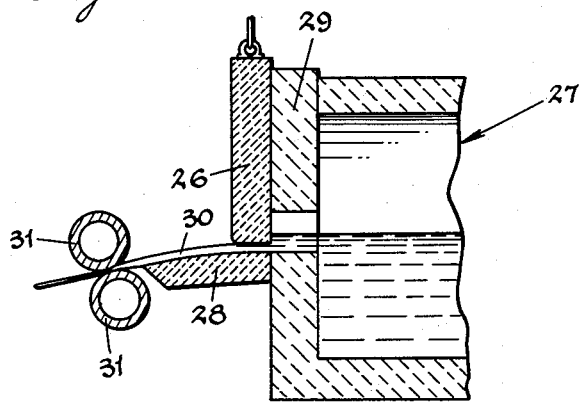
Fig. 4 is a fragmentary cross-section of an end of the flow type plate glass furnace.

Refractories containing over 1% and not more than 5% of vanadium or chromium oxide are also of important application to the production of plate glass by presently known methods. Thus, as shown in Fig. 4, a gate 26 of either clay or zirconium silicate with the specified percentage of $V_2O_5$ or $Cr_2O_3$ mixed and formed therein may be located adjacent and against the exit end of a conventional flow type plate glass furnace 27. In addition, a vanadium or chromium oxide refractory lip or block 28 may be formed as an abutment from the end wall 29 of the furnace whereby the molten glass 30 upon flowing outwardly and downwardly, and prior to its passage between the horizontal rollers 31, will have the surface tension thereof reduced and any cords present therein rendered unobjectionable from optical and mechanical standpoints.

In addition to the shapes and locations above disclosed, a refractory of the flux-type or fusion cast and containing more than 1% and less than 5% of vanadium or chromium oxide may be formed as an inverted T with the cross bar thereof positioned below the glass level, as a flat plate or round bar, or as an hexagonal or octagonal bar. Also, the refractory may be located beneath the jack-arch 15, may be suspended from said arch or may be floated within the upper surface of the molten glass 6 transversely of the furnace 5 at a location either in the refining end 7 or cooling chamber 8 of the furnace. Regardless of the particular shape or location of the refractory, however, it is extremely desirable that the content of vanadium or chromium oxide be within the range of not less than 1% nor more than 5% in the interests of economy, and the avoidance of coloration of the glass and possible corrosion of the refractory.

It will of course be appreciated that when it is stated in the hereinabove examples that the refractory is produced by conventional methods, such as firing, that it is within the contemplation of the invention that the refractory be made by other methods, as electromelting. The suggested percentages of vanadium oxide and chromium oxide relate only to the composition of the refractory itself, and not to the method of forming the desired shapes.

We claim:

1. A glass contact refractory consisting essentially of from 30 to 45% aluminum oxide, 50 to 70% silicon oxide, and from 1 to 5% of an oxide of a metal selected from the group consisting of chromium and vanadium.

2. A glass contact refractory consisting essentially of from 30 to 45% aluminum oxide, 50 to 70% silicon oxide, and not less than 1% nor more than 5% of vanadium oxide.

3. A glass contact refractory consisting essentially of from 30 to 45% aluminum oxide, 50 to 70% silicon oxide, and not less than 1% nor more than 5% of chromium oxide.

4. A glass contact refractory consisting essentially of from 30 to 45% aluminum oxide, 50 to 70% silicon oxide and from 1 to 5% vanadium oxide.

5. A glass contact refractory consisting essentially of from 30 to 45% aluminum oxide, 50 to 70% silicon oxide and from 1 to 5% chromium oxide.

6. A refractory floater for use in a glass melting furnace, said floater consisting essentially of from 30 to 45% aluminum oxide, 50 to 70% silicon oxide, and from 1 to 5% vanadium oxide.

7. A method of improving the quality of molten glass as it flows through a continuous tank furnace to the point of withdrawal, which comprises passing the molten glass through said furnace, and contacting said glass with a refractory body consisting essentially of from 30 to 45% aluminum oxide, 50 to 70% silicon oxide, and from 1 to 5% vanadium oxide, to substantially eliminate cords from the glass by reducing the surface tension of the refractory glass formed by said contact of the molten glass with the refractory body.

References Cited in the file of this patent

UNITED STATES PATENTS

| | | |
|---|---|---|
| 2,207,558 | Singer | July 9, 1940 |
| 2,261,400 | Morgan | Nov. 4, 1941 |
| 2,311,228 | Heany | Feb. 16, 1943 |
| 2,332,014 | Schwartzwalder | Oct. 19, 1943 |
| 2,369,709 | Baumann | Feb. 20, 1945 |
| 2,482,580 | Feichter | Sept. 20, 1949 |

FOREIGN PATENTS

| | | |
|---|---|---|
| 377,964 | France | 1907 |